(12) United States Patent
Aydin et al.

(10) Patent No.: US 10,175,410 B2
(45) Date of Patent: Jan. 8, 2019

(54) LIGHT

(71) Applicant: Ortana Elektronik Yazilim Taah. San. Ve Tic. A.S., Ankara (TR)

(72) Inventors: Umut Aydin, Ankara (TR); Birhan Uguz, Ankara (TR)

(73) Assignee: ORTANA ELEKTRONIK YAZILIM TAAH. SAN. VE TIC. A.S., Ankara (TR)

( * ) Notice: Subject to any disclaimer, the term of this patent is extended or adjusted under 35 U.S.C. 154(b) by 322 days.

(21) Appl. No.: 15/121,870

(22) PCT Filed: Mar. 6, 2015

(86) PCT No.: PCT/EP2015/054788
§ 371 (c)(1),
(2) Date: Aug. 26, 2016

(87) PCT Pub. No.: WO2015/132408
PCT Pub. Date: Sep. 11, 2015

(65) Prior Publication Data
US 2017/0219760 A1    Aug. 3, 2017

(30) Foreign Application Priority Data

Mar. 6, 2014 (EP) .................................. 14158178

(51) Int. Cl.
| | | |
|---|---|---|
| *G02B 6/10* | (2006.01) | |
| *F21V 8/00* | (2006.01) | |
| *F21V 5/02* | (2006.01) | |
| *F21V 7/00* | (2006.01) | |

(52) U.S. Cl.
CPC .............. *G02B 6/0028* (2013.01); *F21V 5/02* (2013.01); *F21V 7/0091* (2013.01); *G02B 6/003* (2013.01);
(Continued)

(58) Field of Classification Search
CPC ......... F21V 7/009; F21V 5/02; G02B 6/0028; G02B 6/003; G02B 6/0031; G02B 6/0038; G02B 6/0046; G02B 6/0055
See application file for complete search history.

(56) References Cited

U.S. PATENT DOCUMENTS

| | | |
|---|---|---|
| 5,050,946 A | 9/1991 | Hathaway et al. |
| 7,891,840 B1 | 2/2011 | Kang et al. |
| (Continued) | | |

FOREIGN PATENT DOCUMENTS

| | | |
|---|---|---|
| CN | 1632667 A | 6/2005 |
| CN | 1979290 A | 6/2007 |
| (Continued) | | |

OTHER PUBLICATIONS

CN Office Action with English Translation, dated Apr. 28, 2017, 9 pages.

(Continued)

*Primary Examiner* — Peggy Neils
(74) *Attorney, Agent, or Firm* — Edell, Shaprio & Finnan, LLC

(57) ABSTRACT

The invention relates to a light comprising: a primary lightpipe (2); and, a light source (1). The primary lightpipe may have: a lightpipe inlet side (3) constructed and arranged to receive light from the light source and to allow it to enter the primary lightpipe; a back side (6*b*) being provided with a serrated structure (5) comprising a reflecting surface (10) to reflect light from the light source; and, a front side (6*a*) constructed and arranged to internally reflect the light received from the light source to the back side of the primary lightpipe and to transmit light received from the reflecting surface.

12 Claims, 5 Drawing Sheets

(52) U.S. Cl.
CPC ......... *G02B 6/0031* (2013.01); *G02B 6/0038* (2013.01); *G02B 6/0055* (2013.01); *G02B 6/0046* (2013.01)

(56) References Cited

U.S. PATENT DOCUMENTS

| | | | |
|---|---|---|---|
| 8,087,811 B2* | 1/2012 | Pakhchyan | G02B 6/0033 362/606 |
| 2003/0049007 A1 | 3/2003 | Sommers et al. | |
| 2011/0205745 A1 | 8/2011 | Conzatti et al. | |
| 2011/0304784 A1 | 12/2011 | Hirota et al. | |
| 2012/0236593 A1 | 9/2012 | Wei et al. | |
| 2016/0252225 A1* | 9/2016 | Tsujimoto | E06B 9/24 359/598 |

FOREIGN PATENT DOCUMENTS

| | | |
|---|---|---|
| CN | 102202937 A | 9/2011 |
| CN | 102392956 A | 3/2012 |
| EP | 0022106 A1 | 1/1981 |
| EP | 0453932 A2 | 10/1991 |
| EP | 1184619 A2 | 3/2002 |
| EP | 2056136 A2 | 5/2009 |
| EP | 2369374 A2 | 9/2011 |
| GB | 2321300 A | 7/1998 |
| WO | 9826212 A1 | 6/1998 |
| WO | 2011029158 A1 | 3/2011 |

OTHER PUBLICATIONS

English translation of CN Office Action, dated Jan. 3, 2018, 7 pages.
PCT The International Search Report and the Written Opinion, PCT/EP2015/054788, dated May 8, 2015, 11 pages.
PCT International Preliminary Report on Patentability, PCT/EP2015/054788, dated Jun. 13, 2016, 8 pages.
European Search Report, EP14158178, dated Jul. 17, 2014, 9 pages.
PCT Written Opinion of the International Preliminary Examining Authority, PCT/EP2015/054788, dated Mar. 10, 2016, 6 pages.

* cited by examiner

LIGHT

FIELD

The invention relates to a light (e.g. a light signalling device), comprising:
a primary lightpipe; and,
a light source (e.g. a light-emitting diode (LED)).

BACKGROUND

The light may be used, for example, for traffic lights, which are present at road connections, junctions, pedestrian crossings, various surfaces of a vehicle (e.g vehicles with rubber tire, tracked vehicles and rail vehicles) and other locations where the traffic is required to be controlled. The light may deliver signals via universal color codes in order to regulate traffic.

Until the development of LED technology, traffic lights were produced with incandescent lamp and/or halogen lamp technology. In traffic lights with incandescent and halogen lamps, bright reflective surfaces are used, which direct the light according to any desired angles. Moreover, in order to obtain a homogeneous intensity on the front surface of the lamp, the light source is required to be located at a certain distance from the lens. For this reason, lights with more depth and bigger dimensions were produced. In addition, due to the reflective surfaces used, solar rays may reflect back and reduce the contrast ratio.

LEDs, which were introduced for use with the advance of semiconductor technology, have begun to provide the same light intensity as that given by conventional light sources using much less energy. Further, their small size, longer service lifetime and inexpensive price enables them to be used more efficiently as compared to conventional lamps.

It is possible to form a thinner structure by using a large number of low power LEDs directly arranged on the front surface of a lamp, in order to display information in the traffic lights. However, in order for LEDs to become less affected by the ambient conditions and to achieve the desired angles, colors, intensity and contrast values, it is more appropriate to use the LEDs together with a lens or a series of lenses with protective and optical features.

In the application of high power LEDs, a reduced number of LEDs were positioned at the focal plane of a Fresnel lens. In this way, it becomes possible to gather the intensity from the focal plane in the form of parallel light beams from each individual LED, the total amount of light being within an acute angle with the axis of the Fresnel lens. On the other hand, as is the case with halogen and incandescent lamps, lights with more depth and bigger dimensions were also formed. In front of the Fresnel lens, an outer lens may be used, which distributes the parallel light beams through suitable angles. Rays passing through two different lens surfaces lose their efficiency to some extent, as a result of reflection on each surface.

The Fresnel lens being employed is not able to gather the light with sufficient efficiency and is not able to achieve parallel light beams in the desired manner. For this reason, for example as in the patent no. US2005/0286145 A1, suitable geometries are formed for each angle of radiation.

In traffic lights that operate directly under sun light, it may be required to reduce the back reflection of the sun light in order to increase the contrast value.

It may also be useful to use colored lenses to increase contrast. The lenses may be manufactured with the same color as the color of radiation, thereby enabling the other colors in the solar color spectrum to be absorbed by the lens. Radiation sources that are not monochromatic have a certain wavelength range. It is quite difficult to produce colored lenses without optical absorption in the wavelength range of the light source. For this reason, a significant portion of the light source energy may be lost due to exposure to absorption in the colored lens applications.

Moreover, colored lenses may shine in their own colors when exposed to intense solar light and this may misguide drivers.

Antireflection coatings may also be used on the lens surface. Even though sufficient results are obtained in the calculated wavelength range by this method, no efficient results may be obtained for solar light having a broad spectral range and a wide range of angles of incidence. Multi-layer coatings must be made for a wider wavelength range, but this method is quite expensive. The coatings are also influenced by the weather conditions and may in time begin to peel from the lens surface and lose their effectiveness.

In U.S. Pat. No. 8,152,339 B2, a lightpipe structure is applied on a circular surface, the radiation source is located at the center of the lightpipe and a secondary lens is used in front of the lightpipe. Furthermore, in the same patent, a circular surface is illuminated by a single radiation source from the side surface. However, in this method, a secondary lens in front of the lightpipe is needed in order to provide the homogeneity of the radiation and it may not be possible to obtain a sufficiently homogeneous illumination of the surface by the light emitted from a single source.

Further, the lightpipe structure is applied to different quadrangular surfaces in the U.S. Pat. Nos. 5,303,322 and 5,050,946.

Traffic lights with more depth and bigger dimensions are produced in order to obtain a homogeneous intensity. It may be beneficial to provide thinner combinations of lens and light sources for the light while at the same time obtaining a homogeneous intensity.

SUMMARY

It is an objective of the invention to provide an improved light.

Accordingly there is provided a light comprising:
a primary lightpipe (2); and,
a light source (1);
wherein the primary lightpipe comprises:
a lightpipe inlet side (3) constructed and arranged to receive light from the light source and to allow it to enter the primary lightpipe;
a back side (6b) being provided with a serrated structure (5) comprising a reflecting surface (10) to reflect light from the light source; and,
a front side (6a) constructed and arranged to internally reflect the light received from the light source to the back side of the primary lightpipe and to transmit light received from the reflecting surface.

By providing the serrated structure to a back side of the lightpipe it becomes possible to make a very compact light.

According to an embodiment the serrated structure may have a first and a second surface and the first surface is provided with the reflective surface (10) to reflect light from the light source towards the front side. Reflection is a highly efficient way to redirect the light from the light source towards the front side.

According to a further embodiment the serrated structure may have a first and a second surface and the second surface is provided with a light absorbing surface (11). By providing a light absorbing surface to the serrated surface any light from the sun which may fall on the light may be absorbed by the light absorbing surface.

According to an embodiment the second surface may be substantially perpendicular to the back side (6b). In this way the first surface will cover more of the backside with reflecting surfaces such that no area of the back side is left without light reflecting area.

According to a further embodiment the front and backside of the primary lightpipe may have a substantially circular shape. The light sources may be provided along an outer perimeter of the circular light.

According to yet a further embodiment the backside of the primary lightpipe may have a substantially conic shape. By having the top of the cone in the middle of the light it may be assured that the light intensity from the light may be evenly distributed over the light.

According to a further embodiment a light absorber surface (4) may be provided surrounding the light source. Back reflection of sunlight may be reduced in this way.

According to an embodiment a secondary lightpipe (12) may be provided between the light source and the lightpipe inlet side (3). The secondary lightpipe may be used to redistribute the light uniformly.

According to an embodiment the light propagation direction in the secondary lightpipe is substantially perpendicular to the light propagation direction in the primary lightpipe. The secondary lightpipe may distribute the light in a first direction while the secondary light pipe may distribute the light in a second direction.

According to an embodiment a collector lens (13) is positioned between the light source and the secondary lightpipe to collect the light of the light source. With the collector lens all the light from the light source may be collected.

According to an embodiment a separator (15) is positioned between the light source and the secondary lightpipe to split the light beam into two separate beams. In this way the light may be distributed over two light pipes.

According to an embodiment a guiding geometry (14) may be provided in the secondary lightpipe to guide the light from the secondary lightpipe into the primary lightpipe. This may be necessary because the direction of propogation of the light in the secondary light pipe may be perpendicular to the propagation direction in the primary light pipe.

According to an embodiment channels (18) with reflecting walls may be provided between the primary and secondary lightpipes to reflect the light from the secondary light pipe into the primary lightpipe. The reflector wall may be mounted on a wall base (19) which may be provided with an absorber surface (20) near the entrance of the primary lightpipe. The absorber surface may minimize backward reflections from sun light entering at the front side.

According to a further embodiment the primary lightpipe is provided with a mechanical absorber surface (22) for dividing the surface of the lightpipe into compartments, each compartment having a separate color. This may be useful in applications such as the rear light of a car in which multiple colors are necessary.

BRIEF DESCRIPTION OF THE FIGURES

Embodiments of the invention will be described, by way of example only, with reference to the accompanying schematic drawings in which corresponding reference symbols indicate corresponding parts, and in which.

DETAILED DESCRIPTION

The light comprises a light source e.g. LED (1) and a primary lightpipe (2), which enables the light of the light source to achieve the desired intensity. The geometric structure of the lightpipe (2) is specifically designed to collect and guide the light emitted from the light source.

Figure 1:
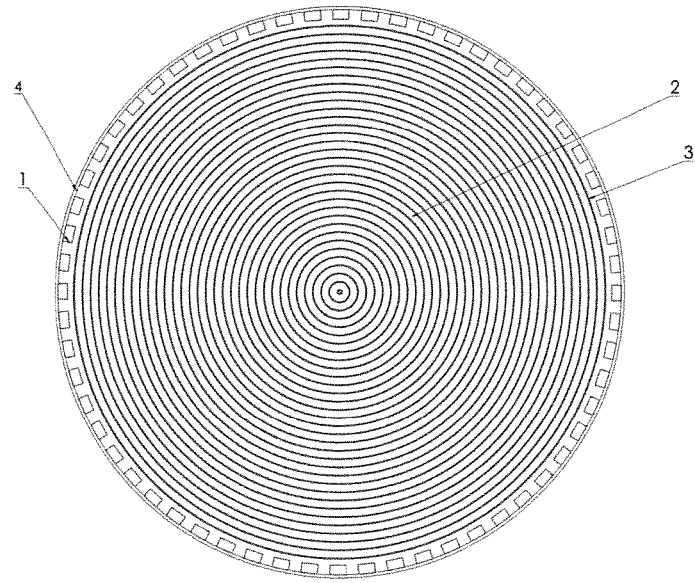
FIG. 1 depicts a front view of a circular light formed with a lightpipe and the position of the LEDs.

The primary lightpipe comprises a lightpipe inlet side (3) constructed and arranged to receive light from the light source and to allow it to enter the primary lightpipe (2). Thereby the light enters the light pipe from the side instead of from the back side of the light pipe (FIG. 1). In this way, a light with thinner and lighter structure may be formed.

The primary light pipe may have a back side (6b) (see FIG. 2) being provided with a serrated structure (5) comprising a first surface which is a reflecting surface (10) to reflect light from the light source; and, a second surface which is a light absorbing surface (11) to absorb light received from the front. The light absorbing surface may be perpendicular to the back side 6b. Since the serrated structure (5) may be used in the light pipe the rear surface as seen from the front may look as it is covered with the absorber surfaces (11) (see FIG. 4), thereby significantly increasing the contrast value. Between the light pipe (2) and the serrated structure (5) there is a space which may be wedge shaped with a narrow top and a wider bottom. The surface of the space with the light pipe (2) forms the internal reflecting surface (10).

The front side (6a) of the primary light pipe (2) may be constructed and arranged to internally reflect the light received from the light source to the back side of the primary lightpipe and to transmit light received from the reflecting surface (10) of the back side 6b.

The primary lightpipe (2) may be formed circular or in another form in order to obtain the light in the required shape. The backside of the primary lightpipe may be cone shaped.

The guiding of the light rays inside the light pipe take place according to the law of total reflection. According to this law, when the light rays are passing from a medium of greater refractive index to a medium of smaller refractive index, they perform total reflection and remain within the medium of the greater refractive index, if the angle of incidence is over a certain value. All geometries in the lightpipe are designed with angles such that the light from the light source e.g LED (1) may perform full reflection within the primary lightpipe (2). After the first reflecting surface (10) is reached by the light, the light is reflected almost perpendicular to the front side (6a) such that the light traverses through the front side.

Ideally, all light is expected to reflect by an angle equal to the incidence angle in cases of total reflection (specular reflection); however, the light reflects not at a single angle but also at different angles at reduced intensity during the reflection of the light from a surface (diffuse reflection). In cases where there is no total reflection, a part of the light passes into the second surface, while a part of it is reflected back.

Figure 2:
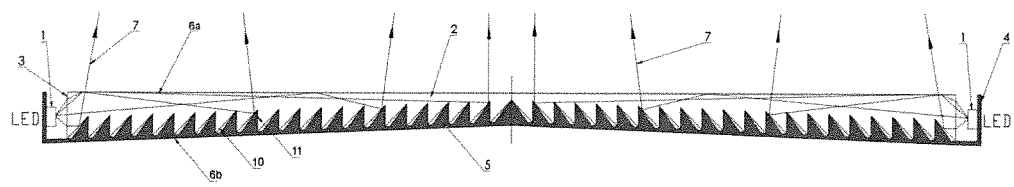
FIG. 2 depicts a horizontal cross-section of a circular light with a flat front surface.
Figure 4:
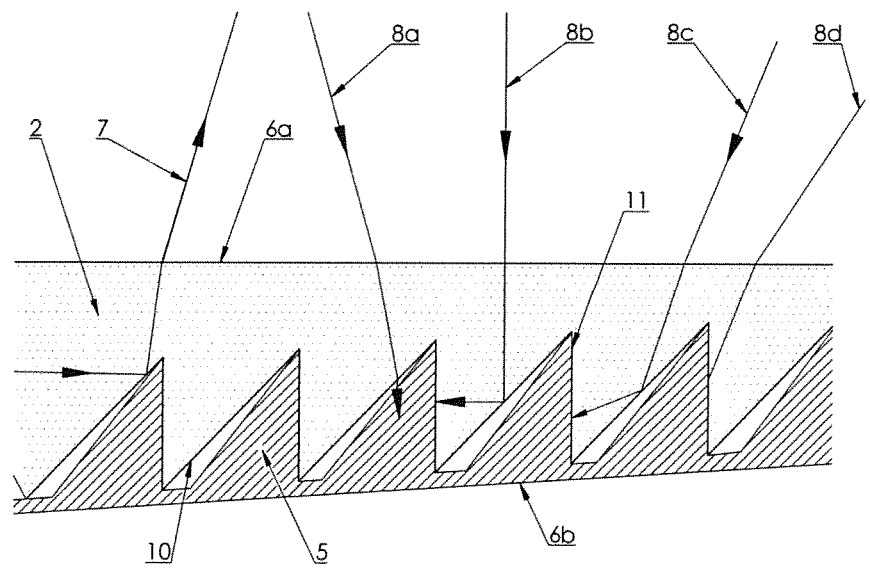
FIG. 4 depicts reflection of the light between the guiding surfaces and the absorption of the solar rays on the surfaces positioned on the bottom surface of the lens.

As can be seen in FIGS. 2 and 4, the LED (1) rays entering via the inlet side (3) are distributed from the front side (6a) of the primary lightpipe (2) by different angles for each light ray (7).

The inlet side (3), which is close to the light source (1), enables as much light as possible to enter the primary light pipe (2) and to be guided into the lightpipe. The top side (6a) of the light pipe enables the light to perform total reflection within the lightpipe and to reach all points within the light pipe. In order to obtain homogeneous intensity, the light pipe thickness is usually gradually reduced from the region close to the light source (1) towards the region away from the light source (1). The serrated structure (5) enables the light (7) to be reflected at appropriate angles to the outside of the lightpipe (2). In order to provide desired optical values, the three sides are set to appropriate size via optimization performed in an optical design program. The position of the light source (1) with respect to the inlet side (3) of the light pipe (2) determines the angle and extent by which the light rays enter the light pipe (2).

The greater the number of reflecting surfaces (10) and the smaller the size of the reflecting surfaces (10) on the back side of the lightpipe, the greater the homogeneity of the intensity.

The lightpipe inlet side (3) may have different shapes according to the geometry of the designed reflecting surface (10). Thereby, the light may be enabled to advance in parallel, focused or distributed beams inside the lightpipe (2). All these properties will vary according to the length of the lightpipe (2) and the optical angles of the radiation source (1).

Figure 3:
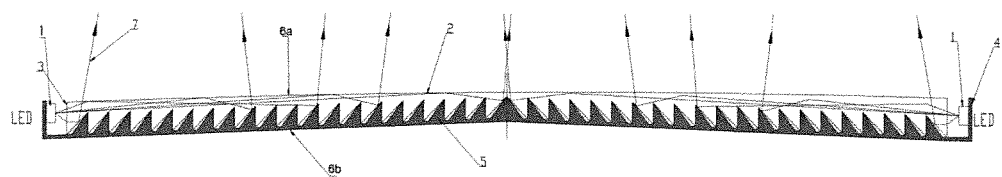
FIG. 3 depicts a horizontal cross-section of a circular signal light with a spherical front surface.

The optical performance may be increased by applying different geometries on the front side (6a) of the lens; however, since the front side forms the outer surface of the light, it will minimize dust and water accumulation with a flat or curved geometry with a smooth surface. The sphericity of the top side geometry (FIG. 3) will reduce the extent of back reflection compared to a flat surface.

The lightpipe (2) may be manufactured from materials with high optical transmittance and resistance to UV rays such glass $SiO_2$ or plastics such as Polymethyl methacrylate (PMMA) or Polycarbonates (PC).

Figure 5:
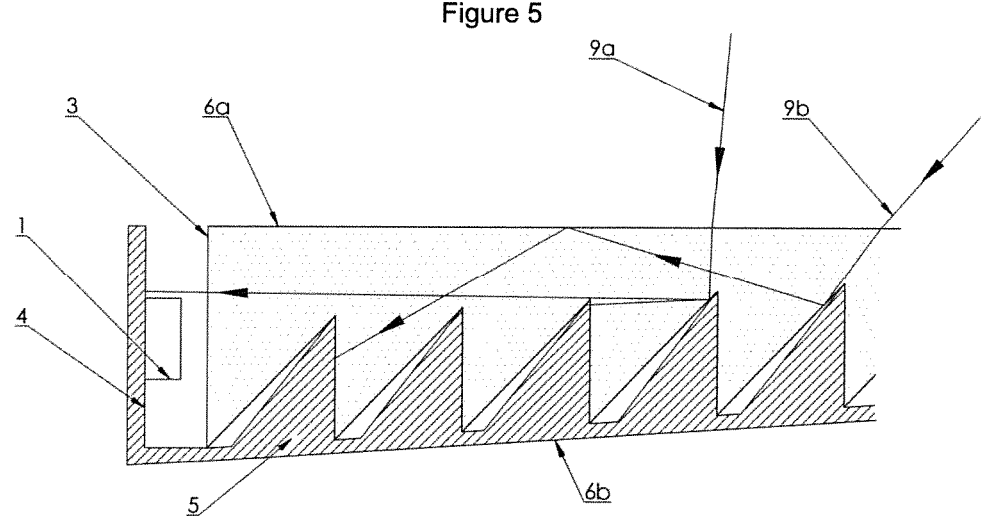
FIG. 5 depicts absorption of the solar rays on the surface positioned behind the LED.

A method has been developed, which reduces the back reflection of solar rays (8, 9) (see FIGS. 4 and 5), in other words, increases the contrast, by means of modifications made on the lightpipe without changing the desired radiant intensity and angle values. As shown in FIGS. 4 and 5 the serrated structure (5) may be provided with an absorber surface (11) where the solar rays (8, 9) are guided and the rear surface of the LED (1) may also be provided with an absorber surface (4) where the solar ray (9b) is guided. The use of a geometric structure in the form of a serrated structure (5) prevents the advance of the solar rays within the light pipe (2) as shown in FIGS. 4 and 5 and significantly increases the contrast ratio.

Owing to the reflecting surface (10) on the back side of the light pipe, the rays (7) coming from the light source (1) are guided through the front side at appropriate angles, while the solar rays (8, 9) reach the absorber surfaces (4, 11) owing to the same geometry. In this way, the solar rays are prevented from reaching a reflecting surface and their back reflection is thus reduced by a considerable extent.

As shown in FIG. 4, in case the solar rays (8a, 8b, 8c) incident at different angles on the serrated structure (5) are incident at the angle of total reflection, they will perform total reflection, be guided to the absorber surface (11) and absorbed. The solar rays (8d) directly incident on the absorber surface (11) are also absorbed.

As shown in FIG. 5, the solar rays (9a), which perform total reflection at the peak points of the serrated structure and advance towards the inner regions of the light pipe, are absorbed to a great extent by the absorber surface (4) behind the LED. Also, the rays (9b), which do not reach the absorber surface (4) behind the LED from the peak points of the serrated structure (5) and reflect from the front side of the primary lightpipe, are absorbed on the absorber surfaces (11).

The serrated structure (5) that is provided to the back side of the lightpipe may have different geometric outlines. The serrated structure may be made from different materials in dark color and may also be provided with different surface shapes to increase the absorptive effect.

Figure 6:
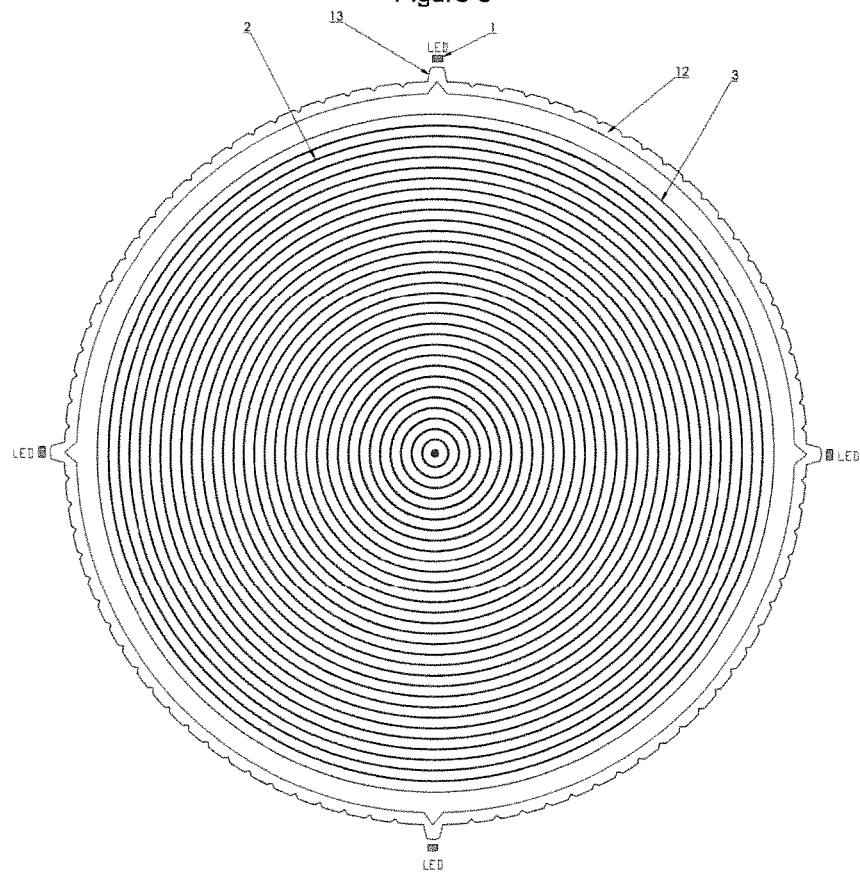
FIG. 6 depicts a rear view of a light provided with a secondary lightpipe according to an embodiment.

When forming a circular primary lightpipe (FIG. 1), it is possible to use a great number of low power LEDS, while it is also possible to provide the solution with a secondary lightpipe (12) that homogeneously distributes the light around the circular primary lightpipe (2) as in FIG. 6, using several high power LEDs.

Figure 7:
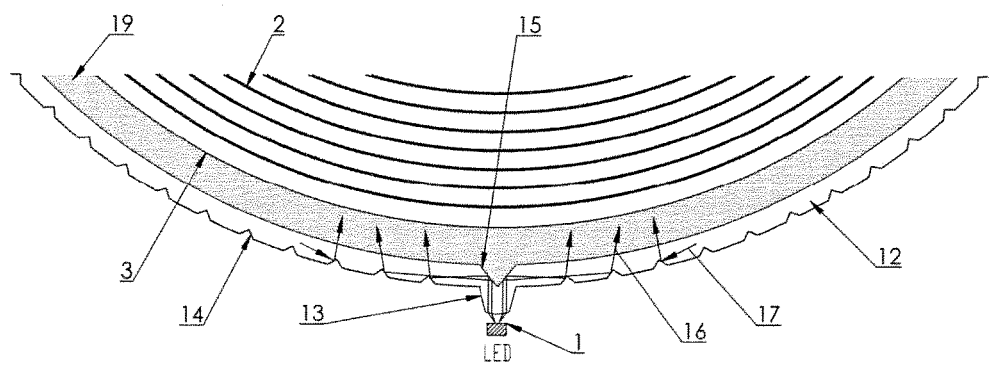
FIG. 7 depicts a detail of FIG. 6.

As can be seen in FIG. 7, the light rays emitted from a light source may be divided into two beams and guided into the secondary lightpipe (12) with the aid of a collector lens (13) and a separator (15). Due to the guiding geometries (14) on the inside of the secondary lightpipe (12), the rays (16) coming from the light source e.g. LED (1) are guided homogeneously into the circular primary lightpipe (2) to mimic a structure with multiple LEDs. A ray (17) coming from another light source reflects from the other surface of the guiding geometry (14) and is guided in the same manner into the primary lightpipe (2).

Figure 8:
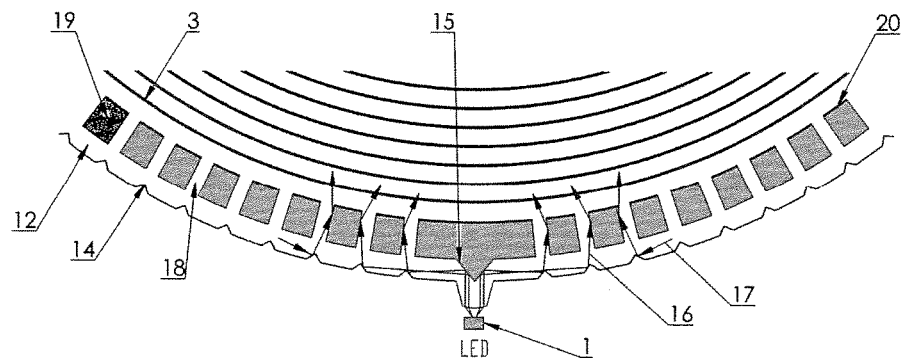
FIG. 8 depicts a detail according to a further embodiment.

As shown in FIG. 8, the light may be enabled to be guided efficiently by opening channels (18) between the secondary lightpipe (12) and the primary lightpipe (2). Due to the the wall base (19) between the channels, the rays (16, 17) emitted from the LED perform total reflection on the reflector walls of the wall base (19) and are guided into the circular primary lightpipe (2). The channels (18) may be designed with different geometries in order to improve the optical performance.

Furthermore, owing to the absorber surfaces (20) that are formed on the surfaces of the wall base (19) facing the primary lightpipe (2), the absorption of solar rays (9a) is accomplished and their return to the front side (the back reflection) is considerably reduced.

Figure 9:
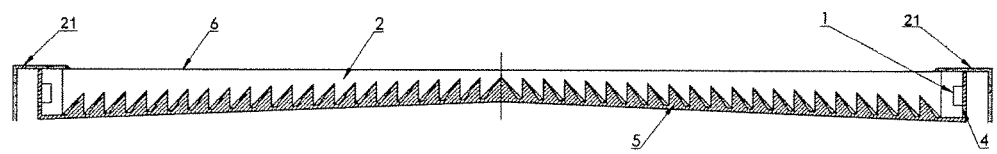
FIG. 9 depicts how the light is formed by attaching a lens to the front panel according to an embodiment.

The primary lightpipe (2) and the serrated structure (5) and the LED (1) are mounted to the front panel (21) of the light in the manner shown in FIG. 9. Accordingly, a solution is obtained, which has a structure which is much thinner than that of the lights currently in use.

The light formed with the lightpipe (FIG. 1) may be made in a circular form, but it is also possible to employ the same method with different geometric shapes for different applications. For example, it is possible to manufacture the light into a signal light or headlight with different geometries and high contrast values for the exterior lighting of automobiles. The serrated structure (5) used on the back side may be used in different designs aimed at high contrast values.

If the light is used as a light for an automobile, it is possible to utilize LEDs in different colors, for example orange for signal light, red for break or rear light and white for reverse which are arranged side by side in order to form a multi-color signal light with a single light.

Figure 10:
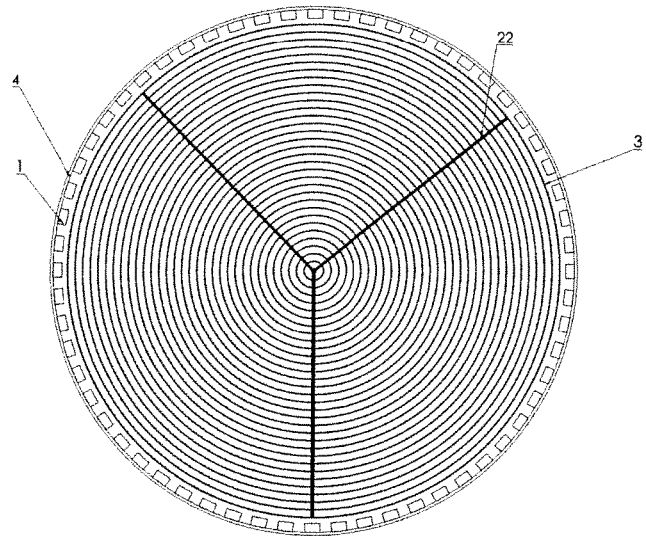
FIG. 10 depicts a light with a surface divided into compartments according to an embodiment; and,
FIG. 11 depicts a quadrangular light divided into compartments according to an embodiment.
Figure 11:
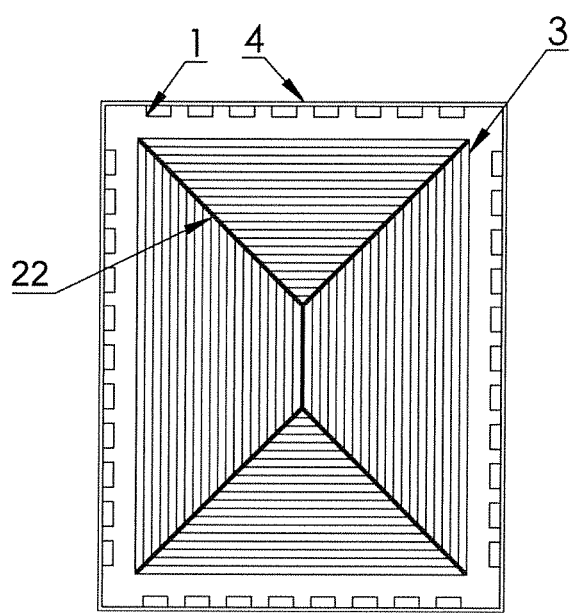

As can be seen in FIGS. 10 and 11, the lightpipe structure may, in addition to the circular surface, have different quadrangular shapes or any other form as necessary. For the automobile or traffic signals, these geometries may be divided into separate compartments, and in this way, the signals with different colors may be obtained from different compartments separated by a mechanical absorber (22) where necessary, in addition to the signals in the same color from all the compartments. In this way, the thin products with high contrast value, which include the signals in different colors, may be obtained with a single structure.

Another possible field of use for this solution is based on the change of the passive visible color of the traffic signal light upon the alteration of the color of the absorber surface. Although the greatest contrast ratio is obtained in many applications by using the dull black as the color of the absorber surface, in case the color of the absorber surface is changed, the signal light will appear in the color of the bottom absorber surface when viewed from the outside during LEDs are off. In this way, it becomes possible to form the lights, which appear in the desired color of the bottom absorber surface, but provide the signal in a different color. Owing to this feature, it may be possible to form the headlights and signal lights that appear in the color of the body of the car and to provide the required signal color when said lights become activated.

REFERENCE NUMBERS OF THE FIGURES

The parts of the figures are assigned with reference numbers having the meaning provided below:
1: Light source LED
2: Primary lightpipe
3: Lightpipe inlet side
4: Absorber surface positioned behind the LED
5: Serrated structure
6a: Front Side of the primary light pipe
6b: Back side of the primary light pipe (serrated structure)
7: LED Rays
8, 9: Solar Rays
10: Reflecting surface
11: Absorber surface of the serrated structure
12: Secondary Lightpipe
13: Collector Lens
14: Guiding geometries
15: Separator
16, 17: Rays
18: Channel
19: Wall base
20: Absorber surface on the wall base
21: Front panel
22: Mechanical absorber While specific embodiments of the invention have been described above, it will be appreciated that the invention may be practiced otherwise than as described. The invention is intended to be illustrative, not limiting. Thus it will be apparent to one skilled in the art that modifications may be made to the invention as described without departing form the scope of the claims set out below.

The invention claimed is:

1. A light comprising:
    a primary lightpipe (2); and,
    a light source (1);
    wherein the primary lightpipe comprises:
        a lightpipe inlet side (3) constructed and arranged to receive light from the light source and to allow it to enter the primary lightpipe;
        a back side (6b) being provided with a serrated structure (5), wherein the serrated structure has a first and a second surface and the first surface is provided with a reflecting surface (10) to reflect light from the light source; and
        a front side (6a) constructed and arranged to internally reflect the light received from the light source to the back side of the primary lightpipe and to transmit light received from the reflecting surface,
    characterized in that the second surface is provided with a light absorbing surface (11), and the second surface is substantially perpendicular to the back side (6b).

2. The light according to claim 1, wherein the front and back side of the primary lightpipe have a substantially circular shape.

3. The light according to claim 1, wherein the back side of the primary lightpipe has a substantially conic shape.

4. The light according to claim 1, wherein a light absorber surface (4) is provided surrounding the light source.

5. The light according to claim 1, wherein a secondary lightpipe (12) is provided between the light source and the lightpipe inlet side (3).

6. The light according to claim 5, wherein a light propagation direction in the secondary lightpipe is substantially perpendicular to the light propagation direction in the primary lightpipe.

7. The light according to claim 5, wherein a collector lens (13) is positioned between the light source and the secondary lightpipe to collect the light of the light source.

8. The light according to claim 6, wherein a separator (15) is positioned between the light source and the secondary lightpipe to split the light beam into two separate beams.

9. The light according to claim 6, wherein a guiding geometry (14) is provided in the secondary lightpipe to guide the light from the secondary lightpipe towards the primary lightpipe.

10. The light according to claim 6, wherein a channel (18) with reflector walls is provided between the primary and secondary lightpipes to reflect the light from the secondary lightpipe towards the primary lightpipe.

11. The light according to claim 10, wherein the reflector wall is mounted on a wall base (19) which is provided with an absorber surface (20) near the entrance of the primary lightpipe.

12. The light according to claim 1, wherein the primary lightpipe is provided with a mechanical absorber surface (22) for dividing the surface of the lightpipe into compartments, each compartment having a separate color.

* * * * *